United States Patent
Espinoza-Ibarra et al.

(10) Patent No.: US 7,124,315 B2
(45) Date of Patent: Oct. 17, 2006

(54) BLADE SYSTEM FOR USING MULTIPLE FREQUENCY SYNTHESIZERS TO CONTROL MULTIPLE PROCESSOR CLOCKS OPERATING AT DIFFERENT FREQUENCIES BASED UPON USER INPUT

(75) Inventors: Ricardo Espinoza-Ibarra, Carmichael, CA (US); Andrew H. Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 10/216,285

(22) Filed: Aug. 12, 2002

(65) Prior Publication Data
US 2004/0068673 A1  Apr. 8, 2004

(51) Int. Cl.
*G06F 1/08* (2006.01)
(52) U.S. Cl. .............. 713/501; 713/500; 713/502; 713/503
(58) Field of Classification Search ........... 713/500, 713/501, 502, 503
See application file for complete search history.

(56) References Cited

U.S. PATENT DOCUMENTS

| | | | | |
|---|---|---|---|---|
| 563,148 | A * | 6/1896 | Norris | 341/53 |
| 6,047,373 | A * | 4/2000 | Hall et al. | 713/1 |
| 6,298,448 | B1 | 10/2001 | Shaffer et al. | |
| 6,433,645 | B1 * | 8/2002 | Mann et al. | 331/18 |
| 6,535,986 | B1 * | 3/2003 | Rosno et al. | 713/400 |
| 6,836,849 | B1 * | 12/2004 | Brock et al. | 713/310 |
| 6,859,882 | B1 * | 2/2005 | Fung | 713/300 |

FOREIGN PATENT DOCUMENTS

EP         0708398         4/1996

OTHER PUBLICATIONS

Search Report issued on Jan. 29, 2004 in counterpart foreign application in GB under application No. 315106.5.
Sun Blade 100 Service Manual:- Functional Description—URL: http://docs.sun.com/source/805-4496-10/appC.htm—(c) Sun Microsystems Inc. 2000, see p. 34.

* cited by examiner

*Primary Examiner*—Chun Cao
*Assistant Examiner*—Erin L Dogan

(57) ABSTRACT

In a system and method for managing the operating frequency of processors in a blade-based computer system, a circuit receives a signal with instructions relating to the desired operating frequency of the processors or blades. The circuit then generates a control signal based upon the specific frequency designated by the user. A frequency synthesizer then processes an input frequency signal and the control signal and outputs an output frequency to be used by at least one processor in the blade-based computer system.

26 Claims, 6 Drawing Sheets

BLADE SYSTEM FOR USING MULTIPLE FREQUENCY SYNTHESIZERS TO CONTROL MULTIPLE PROCESSOR CLOCKS OPERATING AT DIFFERENT FREQUENCIES BASED UPON USER INPUT

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,438, entitled "SYSTEM AND METHOD FOR THE FREQUENCY MANAGEMENT OF COMPUTER SYSTEMS TO ALLOW CAPACITY ON DEMAND" to Andrew H. BARR, et al.; U.S. patent application Ser. No. 10/216,283, entitled "SYSTEM, METHOD AND APPARATUS FOR PERFORMANCE OPTIMIZATION AT THE PROCESSOR LEVEL" to Ricardo ESPINOZA-IBARRA, et al.; U.S. patent application Ser. No. 10/216,234, entitled "SYSTEM AND METHOD FOR LOAD DEPENDENT FREQUENCY AND PERFORMANCE MODULATION IN BLADED SYSTEMS" to Ricardo ESPINOZA-IBARRA, et al.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286, entitled "VOLTAGE MODULATION IN CONJUNCTION WITH PERFORMANCE OPTIMIZATION AT PROCESSOR LEVEL" to Andrew H. BARR, et al.; U.S. patent application Ser. No. 10/216,229, entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" to Andrew H. BARR, et al.; U.S. patent application Ser. No. 10/216,232, entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435, entitled "MANAGEMENT OF A MEMORY SUBSYSTEM" to Andrew H. BARR, et al., all of which are concurrently herewith being filed under separate covers, the subject matters of which are herein incorporated by reference.

BACKGROUND

Bladed servers, or bladed computer systems, are computing systems that provision servers or other computer resources on individual cards, or blades. There are many types of blades—processor blades, server blades, storage blades, network blades, etc.—and one or more of each type of blade is typically housed together in a single structure, thus creating high-density computing systems with modular architectures, ensuring flexibility and scalability of the systems, and reducing space requirements. Server blades, along with storage, networking, and other blades, are typically installed in a rack-mountable enclosure, or chassis, which hosts multiple blades. The multiple blades share common resources, such as cabling, power supplies, and cooling fans.

The telecommunications industry has been using blade server technology for many years. More generally, the condensed blade server architecture benefits people and businesses that: (1) use the Internet to generate revenue and to provide services to customers; (2) are moving some of their business processes to the Web; and/or (3) need the flexibility to deploy Internet-edge applications in their own data center. Because of recent developments in technology, blade servers are now used for applications such as Web hosting, Web caching, and content streaming.

In Web caching applications, frequently-requested Web content is stored closer to the user, thus allowing for quicker retrieval of objects by the user and reducing the time and bandwidth required to access the Internet. Since companies and individuals are now streaming-media (e.g., video and audio) to more effectively communicate both internally and externally, a massive growth of rich media content delivery on the Internet has occurred. Bladed servers are being used to meet the new demands created as a result of this growth.

Though bladed servers provide many advantages, several engineering challenges arise when using bladed servers. Among these challenges is the challenge of designing and operating a bladed system such that sufficient heat is dissipated in the limited space available in the chassis that hosts the system. Some known power limiting strategies include powering down a CPU functional unit, e.g., a floating-point unit or an on-die cache, or trading off speed for reduced power consumption in a hard drive. To address heat dissipation challenges, bladed server systems are designed within an underlying power and thermal envelope. For example, when a chassis that hosts a bladed system has a limited amount of airflow available to cool the blades (i.e., when the system can only dissipate a limited amount of heat), then the chassis is designed for a limited amount of power consumption and an associated limited performance of the blades.

Engineering challenges occur in optimizing the tradeoff between performance and thermal and power requirements. In a bladed architecture, multiple blades, each representing a separate system, are present in the same chassis. Associated with the chassis are a specific set of power and thermal requirements. Specifically, as discussed, these requirements put a limit on the amount of power that can be consumed by the respective blades.

This power limitation limits the frequency that the processors on the blade can run, and thus, limits the performance. In addition, the processors in a system are usually all configured to operate at the same frequency. This further limits the ability for the individual processors to operate at optimal performance and capacity.

Prior solutions included physically returning the system back to the manufacturer or a customization house to have the processors upgraded, or the system reconfigured to make the processors run at a higher frequency. Thus, previous solutions did not allow adjustability at the end user and did not provide a means of increasing the frequency within the system by making tradeoffs of system requirements. That is, systems were designed one way and were not flexible

SUMMARY

In one embodiment of the system and method for managing the operating frequency in a blade-based computer system, a circuit generates a control signal based upon inputs to the circuit by a user. The control signal and an input frequency are then processed by a frequency synthesizer. The frequency synthesizer then outputs a frequency signal to be used by a processor or blade in the computer system.

In another embodiment of the system and method for managing the operating frequency in a blade-based computer system, a circuit receives a signal with instructions related to the operating frequency of the computer system. The circuit generates a control signal based upon a specific frequency designated by the instructions. A frequency synthesizer then processes an input frequency signal and the control signal and outputs an output frequency to be used by a processor or blade in the computer system.

In another embodiment of the system and method for managing the operating frequency in a blade-based computer system a circuit receives a signal with instructions related to the operating frequency of the computer system. The circuit generates a control signal based upon the bus frequency of the computer system and a specific frequency designated by a user. A frequency synthesizer then processes the control signal and outputs an output frequency based upon a multiple of the bus frequency.

In another embodiment of the system and method for managing the operating frequency in a blade-based computer system, an I²C device receives a signal comprising instructions related to the operating frequency of the computer system and generates a control signal. A clock generator then processes an input frequency signal and control signal from the I²C device and outputs an output frequency.

DESCRIPTION OF THE DRAWINGS

The detailed description will refer to the following drawings, wherein like numerals refer to like elements, and wherein.

DETAILED DESCRIPTION

Figure 1:
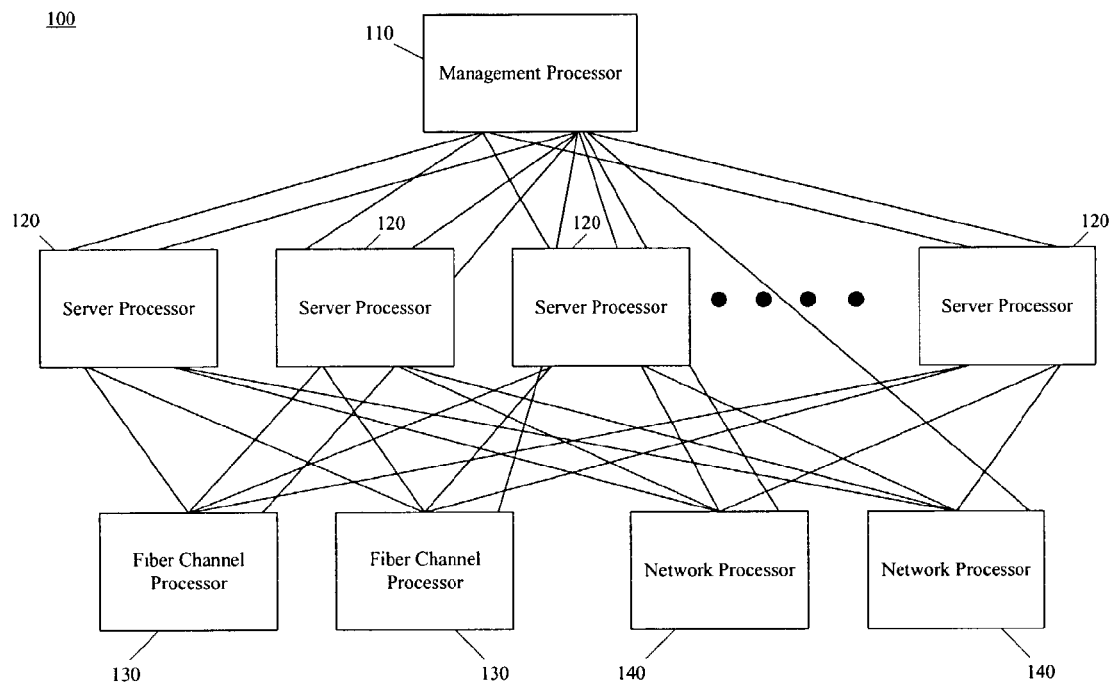
FIG. 1 shows a block diagram depicting one embodiment of the basic modular building blocks of a bladed architecture system.

The preferred embodiments of the method for managing the operating frequency of individual blades in a blade-based computer system will now be described in detail with reference to the following figures, in which like numerals refer to like elements. With reference to FIG. 1 of the Drawings, there is illustrated therein a block diagram depicting one embodiment of the basic modular building blocks of a bladed architecture system, as generally designated by the reference numeral 100. A management blade 110 supervises the functions of the chassis and provides a single interface to the consoles of all the servers installed. As shown in FIG. 1, server blades 120 are in communication with the management blade 110. The server blades 120 are, in turn, in communication with other blades that perform specific functions. For example, as seen in the Figure, server blades 120 are in communication with fiber channel blades 130 and network blades 140. It is to be appreciated that the various blades in a bladed architecture system may be processor blades, server blades, network blades, storage blades or storage interconnect blades, etc.

As discussed above, it is desirous to create a bladed architecture system in which it is possible to adjust the frequency of processors or blades individually. FIGS. 2–7 illustrate various methods for managing the operating frequency of the various processors or blades in the system. In some bladed architectures, the processor core frequency of the CPU is asynchronous to the bus operating frequency; therefore, a change to the processor core frequency can be made independently of the system bus frequency. Currently, Hewlett Packard uses the SPHYR-T ASIC as a frequency-synthesizer for generating the processor clock of the PA-RISC systems. However, one skilled in the art would readily recognize that other synthesizers may also be used. In other embodiments of processor architectures, e.g., IA-32 and IA-64, the processor core frequency of the CPU is not necessarily asynchronous to the bus operating frequency. In IA processors the processor core frequency runs at a programmable multiple of the bus operating frequency. Managing the operating frequency of individual processors or blades can be applied to both architectures by modifying the output of the clock chip, and thus, setting the processor frequency accordingly.

Generally, frequency synthesizer chips used to generate the processor's clocks have parallel or serialized configuration bits that allow one to choose the ratio of the input clock to the output clock (synthesized frequency). This allows one to run the processors at a different frequency upon reboot of the blade. The frequency synthesizer typically has an input frequency from a core crystal. Through controlling the serial or parallel pins, the frequency synthesizer provides the output frequency ratio that is sent to the processors.

One skilled in the art would also appreciate that if multiple frequency synthesizers are utilized, i.e., two (for a 2-way system) or N (for an N-way system), to generate the processors' clocks, the processors are able to operate at different frequencies within the range of frequencies supported by the processor. Further, it is to be appreciated that the methods for modulating the frequency described below are capable of modulating the frequency at both the blade system level and the processor level. FIGS. 2–7 illustrate different methodologies of the how the ratio pins of the different frequency synthesizers can be controlled.

Figure 2:
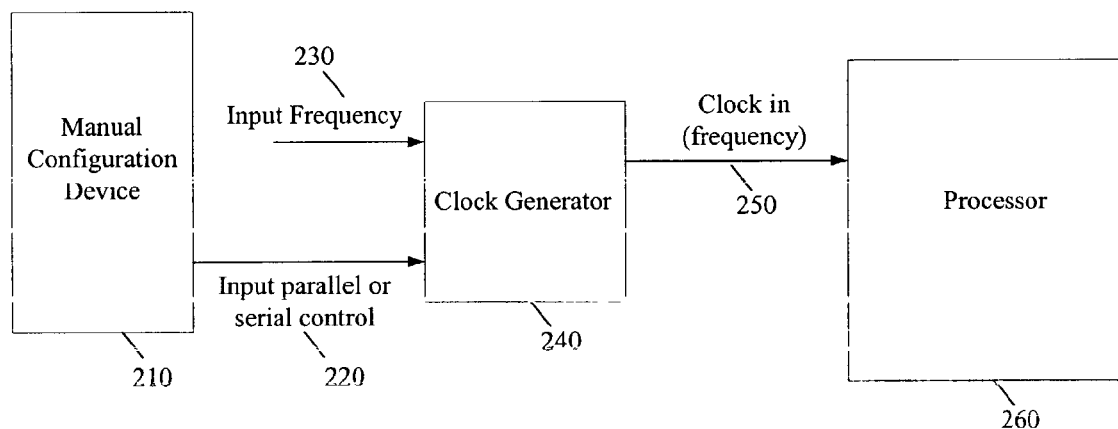
FIG. 2 illustrates a block diagram depicting one methodology of managing the operating frequency by use of a manual configuration device.

With reference now to FIG. 2 of the Drawings, there is illustrated therein a block diagram depicting one methodology of managing the operating frequency of individual processors or blades by use of a manual configuration device 210, as generally designated by the reference numeral 200. As seen in the Figure, the manual configuration device 210 is added to a readily accessible part of the system. Thus, the operator is allowed to set the frequency of the processors upon reboot of the unit, based on predetermined performance requirements. One of ordinary skill in the art would recognize that there are many common manual configuration devices that are capable of performing the desired function, e.g., dip switches, jumpers installed over pin headers, rotational configuration switches, and solder bridges, etc. The input frequency 230 and signal 220 from the manual configuration device 210 are used to generate an output frequency 250 at the clock generator, or frequency synthesizer, 240 that is used by a processor 260. It is to be appreciated that this method of changing the frequency of the processors or blade by use of a manual configuration device, and the other methods described herein below, may be applied to various types of processor architectures, including DEC Alpha, MIPS, PowerPC, SPARC, PA-RISC, IA-32 and IA-64

Figure 3:
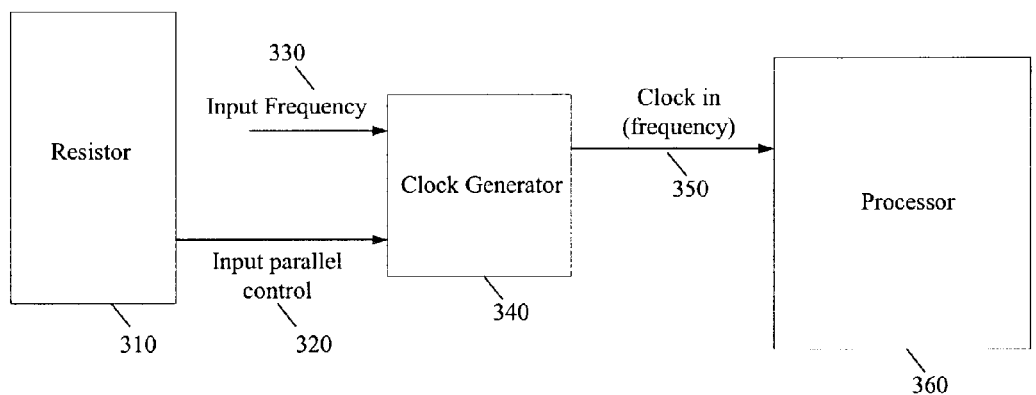
FIG. 3 illustrates a block diagram depicting another method of managing the operating frequency by use of resistors.

With reference now to FIG. 3 of the Drawings, there is illustrated therein a block diagram depicting another method of managing the operating frequency of individual processors or blades, generally designated by the reference numeral 300. Method 300 manages the operating frequency of individual processors or blades by use of a resistor 310. As is known in the art, resistor 310 may be a configuration resistor. As seen in FIG. 3, the resistor 310 is added to a readily accessible part of the system. Thus, the operator is allowed to set the frequency of the processors upon reboot of the unit, based on predetermined performance requirements. An input frequency 330 and signal 320 from the resistor 310 are used to generate an output frequency 350 at a clock generator 340 that is used by a processor 360.

Figure 4:
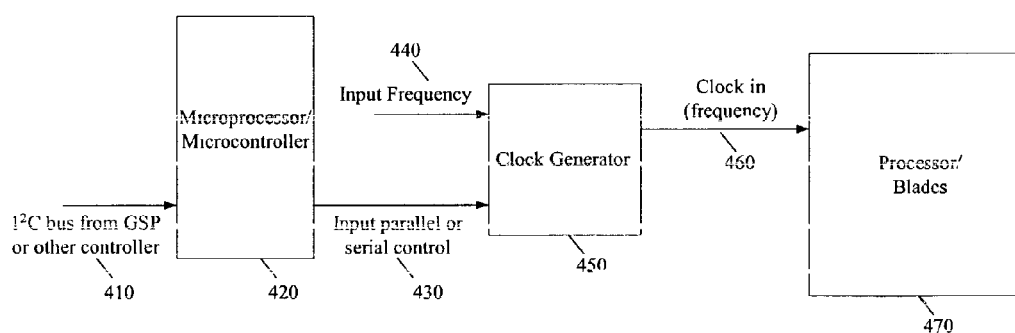
FIG. 4 illustrates a block diagram depicting another method of managing the operating frequency by use of a microcontroller or microprocessor.

With reference now to FIG. 4 of the Drawings, there is illustrated therein a block diagram depicting the method of managing the operating frequency of individual processors or blades by use of a microcontroller or microprocessor 420, as generally designated by the reference numeral 400. The microcontroller or microprocessor 420 is used to interface with the user of the system to ask for the specific frequency at which each blade or processor should run. As seen in FIG. 4, microcontroller or microprocessor 420 receives the signal on a I$^2$C (Inter-IC) bus 410 from the GSP (Guardian Service Processor) or other controller. As is known in the art, the I$^2$C bus is a bi-directional two-wire serial bus that provides a communication link between integrated circuits Further, a person of ordinary skill in the art would readily recognize that other control buses could perform the same functions and be substituted for the I$^2$C bus described herein. The microcontroller or microprocessor 420 outputs a parallel or serial control 430, based upon the specific frequency designated by the user. A clock generator 450 uses an input frequency 440 and parallel or serial control signal 430 to generate an output frequency 460 used by a designated processor or blade 470. The use of the microcontroller or microprocessor 420 allows the user to control the frequency synthesizers in a more transparent way than the above described register and manual configuration device methods, i.e., the user does not necessarily need to know how the settings of the configuration bits will affect the output.

Figure 5:
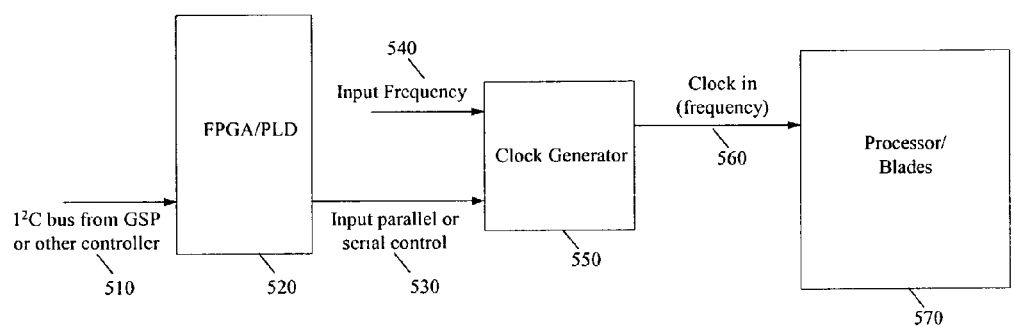
FIG. 5 illustrates a block diagram depicting another method of managing the operating frequency by use of a field-programmable gate array (FPGA) or programmable logic device (PLD)

With reference now to FIG. 5 of the Drawings, there is illustrated therein a block diagram depicting the method of managing the operating frequency of individual processors or blades by use of a FPGA (field-programmable gate array) or PLD (programmable logic device) 520, as generally designated by the reference numeral 500. As is known to those skilled in the art, a FPGA is a chip that can be programmed in the field after manufacture. The FPGA or PLD 520 is used to receive commands from a higher-level device, e.g., the GSP via an I$^2$C bus 510, to control the configuration bits for the frequency synthesizer (or each synthesizer). As seen in FIG. 5, a clock generator 550, uses an input frequency 540 and the control from the FPGA/PLD 530 to generate an output frequency 560 used by a processor or blade 570. Like the use of the microcontroller/microprocessor 420 described in FIG. 4, the FPGA/PLD 520 allows the user to control the frequency synthesizers in a more transparent way, i.e., the user does not necessarily need to know how the settings of the configuration bits will affect the output.

Figure 6:
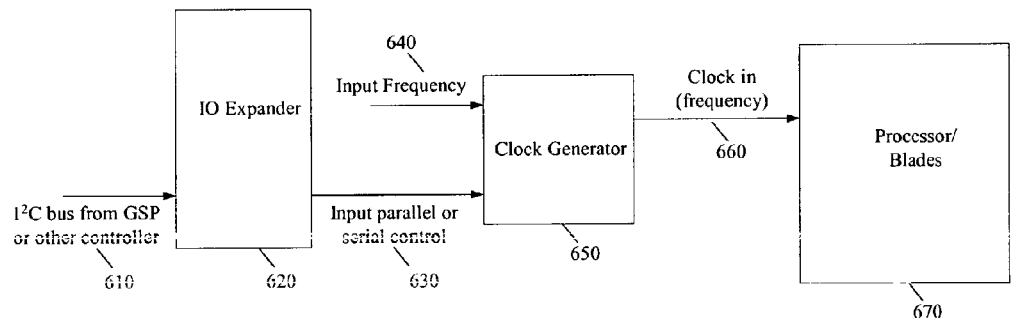
FIG. 6 illustrates a block diagram depicting another method of managing the operating frequency by use of an I/O-Expander chip (I/OX)

With reference now to FIG. 6 of the Drawings, there is illustrated therein a block diagram depicting the method of managing the operating frequency of individual processors or blades by use of an I/O-Expander chip (I/OX) 620, as generally designated by the reference numeral 600. An I$^2$C based I/OX 620 is an inexpensive and simple solution that can be used to transparently control each frequency synthesizer. I/OX chips 620 have I/O ports, which can be forced to a particular state by writing to the I/OX through an I$^2$C command. Since I/OX typically have multiple I/O ports, it is to be appreciated that one I/OX can be used to control multiple frequency synthesizers individually.

Since I/OX chips are I$^2$C-based, they can be controlled by any device that supports an I$^2$C interface. In Hewlett Packard's PA-RISC Blades, a logical such device would be the service processor, or GSP, of the PA Blade. The user-friendly interface of the GSP can be used to transparently allow the customer to control the frequency of the processors without need of any low-level information, e.g., bit-settings. The input from the GSP is designated in FIG. 6 by reference numeral 610. The user at the GSP inputs commands to increase the frequency of the processor. The GSP then delivers the required bits to change the ratio of the frequency generator, so that the processor will run at the desired level. The bit stream 610 is received by the I/OX 620. A clock generator 650 then uses an input frequency 640 and a control signal 630 to generate an output frequency 660 used by a processor or blade 670.

Figure 7:
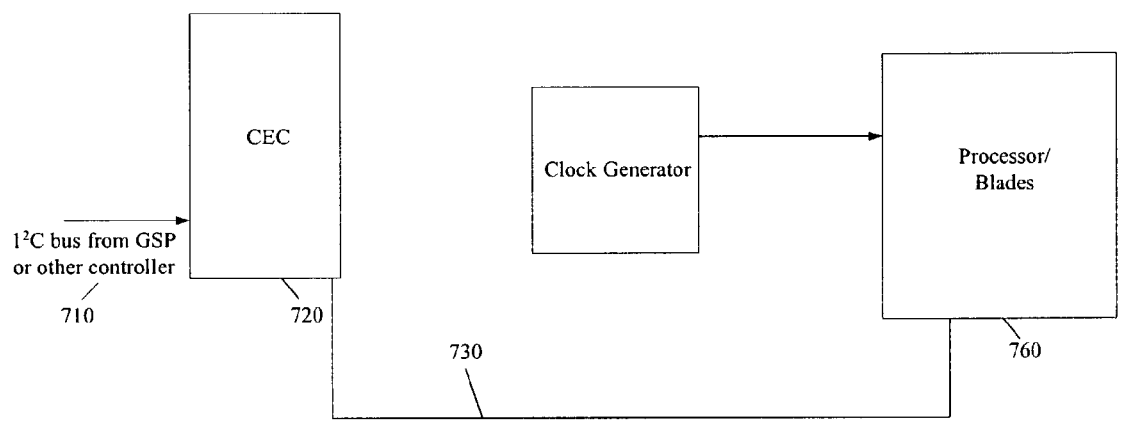
FIG. 7 illustrate a block diagram depicting the methods of managing the operating frequency in an IA based architecture system.

With reference now to FIG. 7 of the Drawings, there is illustrated therein a block diagram depicting the methods of managing the operating frequency of individual processors or blades in an IA based architecture system, as generally designated by the reference numeral 700. As shown above, PA-based architectures have two frequency inputs that are taken into the processor: the processor core input and the bus input. In IA-based architectures the serial or parallel control is not modulated. IA-based architectures program the processor core frequency to generate a multiple of the bus frequency. The programming of the processor core frequency is done during early bus initialization using multipurpose bus lines 730. This is typically controlled by the main core chipset that sits on the processor bus (CEC) 720. Generally, a user interface, e.g., a GSP 710, is used to program the CEC 720 to generate the appropriate control signal during early system and bus initialization. The bus frequency is multiplied for a larger ratio to generate a higher frequency, performance and power, or for a smaller ratio to generate a lower frequency, performance and power, depending on the application at the particular blade or processor 760.

As discussed, the above described methodologies may be used to modulate the frequency at the blade system level or the processor level. For example, as illustrated in the above figures, the clock in frequency is sent to the respective blocks labeled Processor/Blade. The frequency may be sent with the intention of changing the frequency of all the processors on the blade, i.e., changing the frequency of the blade. Or, alternatively, the frequency may be sent with the intent of changing the frequencies of the processors individually, e.g., to adjust the trade off between master and slave processors. The frequency generated from the synthesizer is used to adjusts a processor on the blade.

Figure 8:
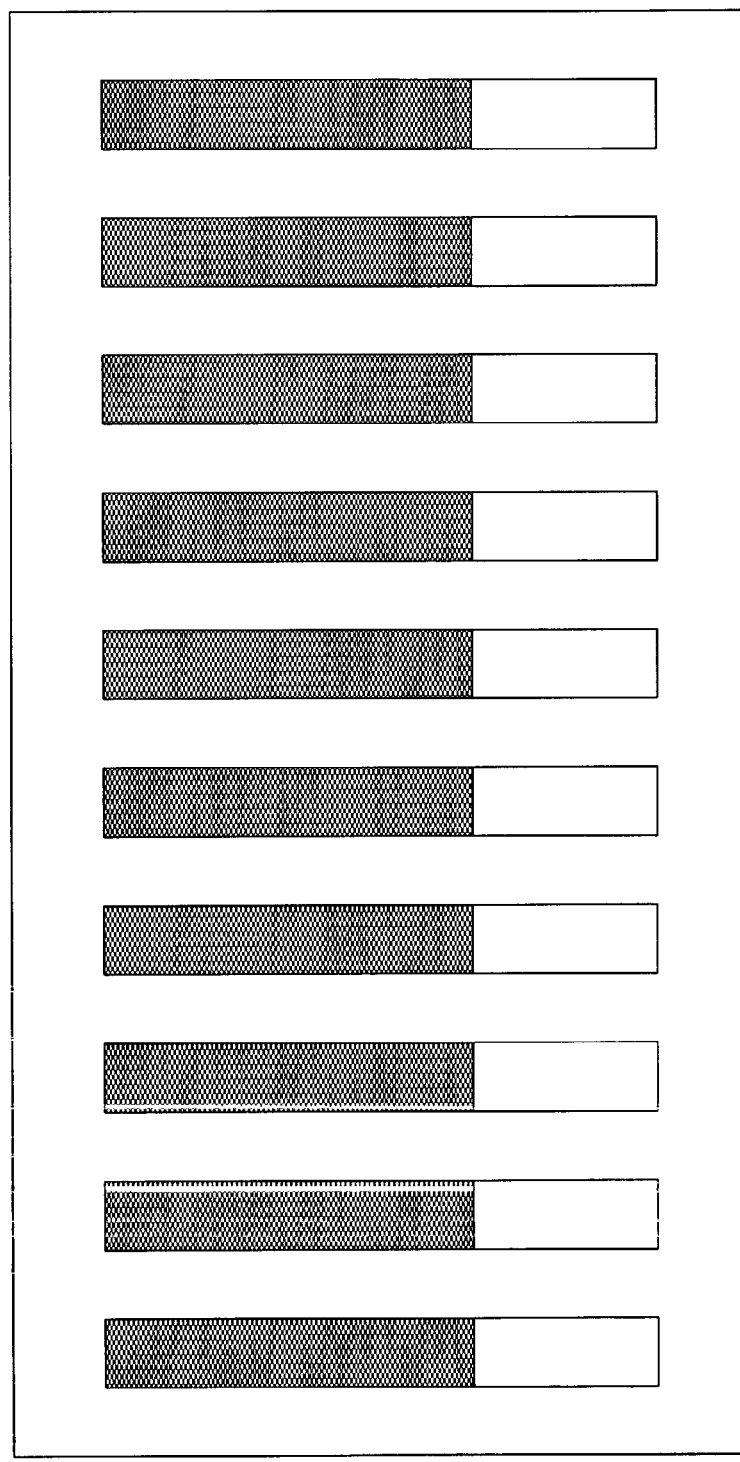
FIG. 8 illustrates a block diagram depicting a series of processors in a bladed system operating at the same frequency level.

With reference now to FIG. 8 of the Drawings, there is illustrated therein a block diagram depicting a series of processors in a bladed architecture running at the same frequency, as generally designated by the reference numeral 800. The shading of the individual processors indicates that each individual processor is operating at the same frequency level. Operating processors at the same frequency is typical in current bladed architecture systems. In addition, the shading illustrates that each processor is operating at a level below the maximum level in order to remain under the maximum power allocated to the system as a whole. As discussed, bladed server systems are limited by an underlying power and thermal envelope. This is due to the heat produced within the blades and to the limited dimensions in the chassis. When the chassis consumes a given amount of the power, the chassis is typically limited in the amount of airflow that is available to cool the blades. As a result, the power limitation limits the frequency that the processors on the blade can run, and thus, limits the performance. The processors are thus limited in their ability to operate at optimal performance and capacity because the processors are configured to operate at the same frequency—a frequency below their maximum level.

Figure 9:
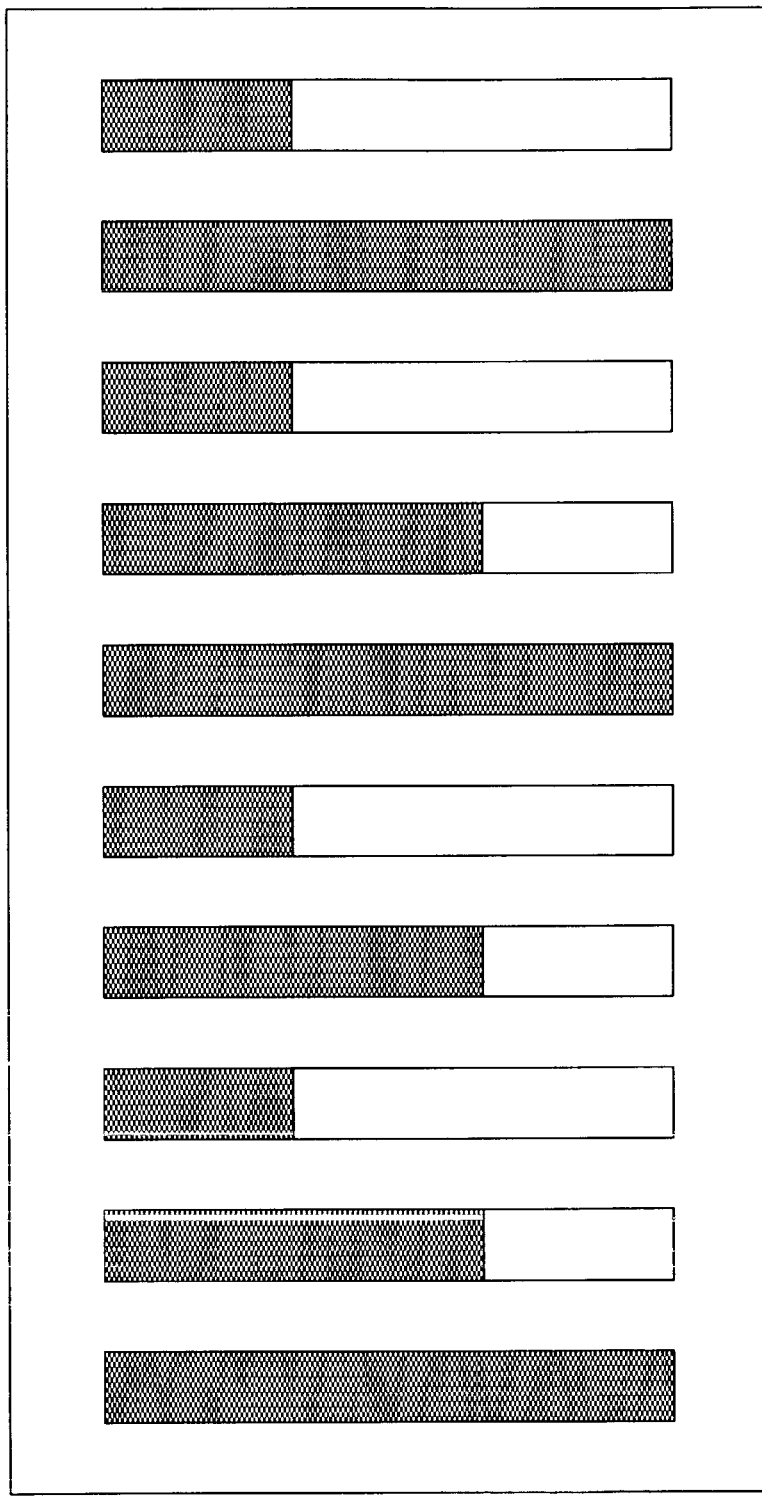
FIG. 9 illustrates a block diagram depicting a series of processors in a bladed system operating at the different frequency levels.

With reference now to FIG. 9 of the Drawings, there is illustrated therein a block diagram depicting a series of processors in a bladed architecture running at different frequencies, as generally designated by the reference numeral 900. The system in FIG. 9 represents a system where the user has been able to adjust the frequency levels of the various processors in the chassis. As a result, the overall system runs at a much more efficient level. As seen in the figure, each processor is now only using the requisite frequency level that is required for its particular function. Because of the varying levels of frequency available to the individual processors, processors that require a higher frequency than the average can now operate at a more optimum level. Similarly, processors that require less power no longer are required to be run at the same frequency level as the other processors. As a result, a more efficient system is created.

It is to be appreciated that the principles disclosed herein may be applied to a system comprised of processors or blades that share a common chassis or to an architecture system that spans multiple chassis. That is, the principles may be applied to systems that are divided by either a physical or logical partition. For example, physically, a system may include 3 chassis, with each chassis having 8 processors. Logically, the same system could be partitioned into 5 different web servers for 5 different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While the systems and methods for managing the operating frequency of individual processors or blades in a blade-based computer system have been described in connection with an exemplary embodiment, those skilled in the art will understand that many modifications in light of these teaching are possible, and this application is intended to cover any variation thereof.

For example, the disclosed system and method makes use of specific I²C devices that are used to receive signals from an I²C bus. Other I²C devices could likewise be used. Thus, the I²C devices shown and referenced generally throughout this disclosure, and unless specifically noted, are intended to represent any and all devices/technologies appropriate to perform the desired function. Likewise, there are disclosed several processors and blades that perform various operations. The specific processor or blade is not important to this disclosure. Thus, it is not applicant's intention to limit this disclosure to any particular form of processor, blade or specific blade architecture.

Further examples exist throughout the disclosure, and it is not applicant's intention to exclude from the scope of this disclosure the use of structures, materials, or acts that are not expressly identified in the specification, but nonetheless are capable of performing a claimed function.

The invention claimed is:

1. A method for managing the operating frequency of processors in a blade-based computer system, said method comprising the steps of:
   using a circuit to control a frequency synthesizer in said blade-based computer system;
   generating, by said circuit, a control signal based upon inputs to the circuit by a user of said blade-based computer system;
   processing, by said frequency synthesizer, an input frequency signal and said control signal from said circuit; and
   outputting, by said frequency synthesizer, an output frequency to be used by said individual processors in said blade-based computer system, wherein said blade-based computer system utilizes multiple frequency synthesizers to generate multiple blades' clocks, wherein said blades are able to operate at different frequencies.

2. The method according to claim 1, wherein said method adjusts the frequency level of individual processors to modulate the frequency within at least one blade at the processor level.

3. The method according to claim 1, wherein said method adjusts the frequency level of at least one processor to modulate the frequency within at least one blade at the blade level.

4. The method according to claim 1, wherein said circuit is a manual configuration device.

5. The method according to claim 1, wherein said circuit is a resistor.

6. The method according to claim 5, wherein said resistor is a configuration resistor.

7. The method according to claim 1, wherein said blade-based computer system is physically partitioned.

8. The method according to claim 1, wherein said blade-based computer system is logically partitioned.

9. A method for managing the operating frequency of processors in a blade-based computer system, said method comprising the steps of
   receiving, by a circuit in said blade-based computer system, a signal, said signal comprising instructions related to said operating frequency;
   generating, by said circuit, a control signal based upon a specific frequency designated by a user;
   processing, by a frequency synthesizer in said blade-based computer system, an input frequency signal and said control signal; and
   outputting, by said frequency synthesizer, an output frequency to be used by said individual processors in said blade-based computer system, wherein said blade-based computer system utilizes multiple frequency synthesizers to control multiple processors' clocks, wherein said processors are able to operate at different frequencies.

10. The method according to claim 9, wherein said method adjusts the frequency level of individual processors to modulate the frequency within at least one blade at the processor level.

11. The method according to claim 9, wherein said method adjusts the frequency level of at least one processor to modulate the frequency within at least one blade at the blade level.

12. The method according to claim 9, wherein said signal received by said circuit is received over an I2C bus.

13. The method according to claim 9, wherein said signal received by said circuit is received from a service processor.

14. The method according to claim 9, wherein said circuit is a microcontroller.

15. The method according to claim 9, wherein said circuit is a microprocessor.

16. The method according to claim 9, wherein said circuit is a field-programmable gate array.

17. The method according to claim 9, wherein said circuit is a programmable logic device.

18. The method according to claim 9, wherein said circuit is an I$^2$C compatible device.

19. The method according to claim 9, wherein said circuit is an VO expander.

20. A method for managing the operating frequency of processors in a blade-based computer system, said method comprising the steps of:
   receiving, by a circuit in said blade-based computer system, a signal, said signal comprising instructions related to said operating frequency;
   generating, by said circuit, a control signal, said control signal based upon the bus frequency of said blade-based computer system and a specific frequency designated by a user; processing, by a frequency synthesizer in said blade-based computer system, said control signal; and
   outputting, by said frequency synthesizer, an output frequency, said output frequency based upon a multiple of said bus frequency to be used by at least one processor, wherein said blade-based computer systems utilizes multiple frequency synthesizers to control multiple processor clocks, wherein processors are able to operate at different frequencies.

21. The method according to claim 20, wherein said method adjusts the frequency level of individual processors to modulate the frequency within at least one blade at the processor level.

22. The method according to claim 20, wherein said method adjusts the frequency level of at least one processor to modulate the frequency within at least one blade at the blade level.

23. The method according to claim 20, wherein said circuit is the main core chipset.

24. The method according to claim 20, wherein a user interface is used to program said main core chipset to generate said control signal.

25. The method according to claim 20, wherein the bus frequency is multiplied to a larger ratio to generate a higher frequency, and said bus frequency is multiplied to a smaller ratio to generate a lower frequency depending on the application at said blade.

26. A system for managing the operating frequency of processors in a blade-based computer system, said system comprising:
   an I$^2$C device in said blade-based computer system, said I$^2$C device receiving a signal, said signal comprising instructions related to said operating frequency;
   a means for generating a control signal in said blade-based computer system based upon said instructions related to said operating frequency;
   a clock generator in said blade-based computer system, said clock generator, receiving said control signal;
   a means for processing an input frequency signal and said control signal from said I$^2$C device in said blade-based computer system; and
   outputting, by said clock generator, an output frequency to be used by at least one processor in said blade-based computer system.

* * * * *

UNITED STATES PATENT AND TRADEMARK OFFICE
CERTIFICATE OF CORRECTION

PATENT NO. : 7,124,315 B2
APPLICATION NO. : 10/216285
DATED : October 17, 2006
INVENTOR(S) : Ricardo Espinoza-Ibarra et al.

Page 1 of 1

It is certified that error appears in the above-identified patent and that said Letters Patent is hereby corrected as shown below:

In column 8, line 57, in Claim 9, after "steps of" insert -- : --.

In column 9, line 15, in Claim 12, delete "I2C" and insert -- $I^2C$ --, therefor.

In column 9, line 29, in Claim 19, delete "VO" and insert -- I/O --, therefor.

Signed and Sealed this

Ninth Day of March, 2010

David J. Kappos
*Director of the United States Patent and Trademark Office*